US012386986B1

(12) United States Patent
Clowser et al.

(10) Patent No.: US 12,386,986 B1
(45) Date of Patent: Aug. 12, 2025

(54) ENDPOINT SECURITY SYNCHRONIZATION

(71) Applicant: Wells Fargo Bank, N.A., San Francisco, CA (US)

(72) Inventors: Robert Clowser, Fredericksburg, VA (US); Dustin Weathers, Huntersville, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 240 days.

(21) Appl. No.: 18/046,065

(22) Filed: Oct. 12, 2022

(51) Int. Cl.
*G06F 21/62* (2013.01)

(52) U.S. Cl.
CPC .................................. *G06F 21/62* (2013.01)

(58) Field of Classification Search
CPC ..... H04L 63/1416; H04L 63/20; H04L 63/14; H04L 63/0263; G06F 21/56; G06F 21/62
See application file for complete search history.

(56) References Cited

U.S. PATENT DOCUMENTS

| | | | |
|---|---|---|---|
| 9,282,122 B2 | 3/2016 | Cabrera et al. | |
| 10,554,493 B2 | 2/2020 | Kompella et al. | |
| 10,873,596 B1* | 12/2020 | Bourget | H04L 51/02 |
| 10,944,720 B2 | 3/2021 | Zivic | |
| 11,153,180 B1 | 10/2021 | Venkata et al. | |
| 11,196,629 B2 | 12/2021 | Tedaldi et al. | |
| 11,290,478 B2 | 3/2022 | Weingarten et al. | |
| 11,522,874 B2* | 12/2022 | Compton | H04L 45/70 |
| 11,736,527 B1* | 8/2023 | Joseph Durairaj | H04L 63/1433 726/1 |

| | | | |
|---|---|---|---|
| 2018/0234457 A1* | 8/2018 | Rajkumar | H04L 41/0631 |
| 2020/0186569 A1* | 6/2020 | Milazzo | H04L 63/08 |
| 2020/0272741 A1* | 8/2020 | Bhatia | G06F 40/284 |
| 2020/0329058 A1* | 10/2020 | Paine | H04L 63/1466 |
| 2020/0336914 A1* | 10/2020 | Kaushik | H04W 12/122 |
| 2021/0144178 A1* | 5/2021 | Bailey | H04L 63/1433 |
| 2021/0273970 A1* | 9/2021 | Alshech | H04L 63/1433 |

(Continued)

FOREIGN PATENT DOCUMENTS

| | | |
|---|---|---|
| EP | 2819346 A1 | 12/2014 |
| WO | 2016118478 A2 | 7/2016 |

OTHER PUBLICATIONS

Islam, Chadni, Muhammad Ali Babar, and Surya Nepal. "A multi-vocal review of security orchestration." ACM Computing Surveys (CSUR) 52.2 (2019): 1-45. (Year: 2019).*

(Continued)

*Primary Examiner* — Kari L Schmidt
(74) *Attorney, Agent, or Firm* — Shumaker & Sieffert, P.A.

(57) ABSTRACT

A computing system is configured to manage and synchronize indicators-of-attack (IOA) rules across multiple tenants of an Endpoint Detection and Response (EDR) tool. The computing system is configured to compare rules between an indicated source tenant and a destination tenant. The computing system may then generate output indicating common rules, updated rules, and missing rules between the source and destination tenants. A user, or the system itself, may update the rules at the destination tenant based on the rules at the source tenant. Such an endpoint security synchronization system avoids problems that may occur with manually transferring IOA rules across multiple tenants of an EDR tool which may result in errors that result in false or misleading security alerts.

20 Claims, 8 Drawing Sheets

(56) References Cited

U.S. PATENT DOCUMENTS

| | | | |
|---|---|---|---|
| 2022/0014535 A1* | 1/2022 | Weingarten | H04L 41/046 |
| 2022/0021683 A1 | 1/2022 | Cassidy et al. | |
| 2022/0086035 A1* | 3/2022 | Devaraj | H04L 43/065 |
| 2022/0150282 A1* | 5/2022 | Bailey | H04L 63/1433 |
| 2022/0198010 A1* | 6/2022 | Ladnai | G06F 21/56 |
| 2022/0391505 A1* | 12/2022 | Kurogome | G06F 21/56 |
| 2022/0417259 A1* | 12/2022 | Kulaga | H04L 63/1425 |
| 2023/0113375 A1* | 4/2023 | Thomas | H04L 63/1441 |
| | | | 726/23 |
| 2023/0247048 A1* | 8/2023 | Samosseiko | H04L 63/1425 |
| | | | 726/23 |
| 2023/0319071 A1* | 10/2023 | Durbin | H04L 63/1466 |
| | | | 726/23 |
| 2024/0281532 A1* | 8/2024 | Baldwin | G06F 21/566 |

OTHER PUBLICATIONS

V. Del Piccolo, A. Amamou, K. Haddadou and G. Pujolle, "A Survey of Network Isolation Solutions for Multi-Tenant Data Centers," in IEEE Communications Surveys & Tutorials, vol. 18, No. 4, pp. 2787-2821, Fourthquarter 2016 (Year: 2016).*

* cited by examiner

602

FilePath

Src:
(?i)(?(?:(?i).+ )(*AND*)(*!(?i)
(.+\x5CWindows\ +\x5CWindows\x5CSoftwareDistribution\
\x5CDownload\x5C.*\ |.+

DST:
(?i)(?(?:(?i).+\\ (*AND*)(*!(?i)
(.+\ |.+ \.exe|.+
.))

FileType

Src:
(?
i:PE|PDF|OLE|RTF|ZIP|OOXML|RAR|DMP|7ZIP|DWG|IDW|DXF
|SLG|CAB|MACHO|TAR|XAR|BZIP2|SCRIPT|ESE|OTHER)

Dst:
(?
i:PE|PDF|OLE|RTF|ZIP|OOXML|RAR|DMP|7ZIP|DWG|IDW|DXF
|SLG|CAB|MACHO|TAR|XAR|BZIP2|SCRIPT|ESE|OTHER)

ENDPOINT SECURITY SYNCHRONIZATION

TECHNICAL FIELD

The disclosure relates to computer-based systems and, in particular, computer systems that manage network security tools.

BACKGROUND

Endpoint detection and response (EDR) tools (e.g., Crowdstrike, Cynet 360 Autonomous Breach Protection Platform, Symantec Endpoint Protection, etc.) are a cyber-security technology that continually monitor an "endpoint" connected to a network (e.g., a mobile phone, personal computer, laptop, Internet-of-Things device, etc.) to mitigate malicious cyber threats to the network.

Endpoint detection and response technology identifies suspicious behavior and threats at endpoints and alerts administrators accordingly. EDR tools typically perform these functions by collecting and aggregating data from endpoints and other sources. Standard capabilities of EDR tools include monitoring endpoints, responding to threats in real-time, increasing visibility and transparency of user data, detecting stored endpoint events and malware injections, and creating blacklists and whitelists.

SUMMARY

In general, this disclosure describes a computing system configured to manage and synchronize indicators-of-attack (IOA) rules across multiple tenants of an Endpoint Detection and Response (EDR) tool. The computing system may be configured to compare rules between an indicated source tenant and a destination tenant. The computing system may then generate output indicating common rules, updated rules, and missing rules between the source and destination tenants. The computing system may then generate output using color coding to indicate each rule type in some examples. Based on the output, a user, or the system itself, may update the rules at the destination tenant based on the rules at the source tenant. The disclosed endpoint security synchronization system may avoid problems with manually transferring IOA rules across multiple tenants of an EDR tool. Manually transferring IOA rules may result in errors in the IOA rules at the destination tenant, which which may cause the EDR tool to generate false or misleading security alerts for the destination tenant.

In one example, this disclosure is directed to a method comprising receiving, at a computing system, source data including first endpoint indicators-of-attack (IOA) security rules for a source tenant of an Endpoint Detection and Response (EDR) system; receiving, at the computing system, destination data including second endpoint IOA security rules for a destination tenant of the EDR system; performing, at the computing system, a difference operation between the first IOA security rules of the source data and the second endpoint IOA security rules of the destination data, and generating, at the computing system, data representative of a user interface for display at an administrator computing device, the user interface indicating common rules, updated rules, and missing rules between the first endpoint IOA security rules for the source tenant and the second endpoint IOA security rules for the destination tenant.

In another example, this disclosure is directed to a computing system comprising a memory; and one or more processors in communication with the memory and configured to receive source data including first endpoint indicators-of-attack (IOA) security rules for a source tenant of an Endpoint Detection and Response (EDR) system; receive destination data including second endpoint IOA security rules for a destination tenant of the EDR system; perform a difference operation between the first endpoint IOA security rules of the source data and the second endpoint IOA security rules of the destination data; and generate data representative of a user interface for display at an administrator computing device, the user interface indicating common rules, updated rules, and missing rules between the first endpoint IOA security rules for the source tenant and the second endpoint IOA security rules for the destination tenant.

In a further example, this disclosure is directed to a computer readable medium comprising instructions that when executed cause one or more processors to receive source data including first endpoint indicators-of-attack (IOA) security rules for a source tenant of an Endpoint Detection and Response (EDR) system; receive destination data including second endpoint IOA security rules for a destination tenant of the EDR system; perform a difference operation between the first endpoint IOA security rules of the source data and the second endpoint IOA security rules of the destination data; and generate data representative of a user interface for display at an administrator computing device, the user interface indicating common rules, updated rules, and missing rules between the first endpoint IOA security rules for the source tenant and the second endpoint IOA security rules for the destination tenant.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 6 illustrates an example rules editing interface generated by the EDR synchronization system for display on a user device, in accordance with the techniques of this disclosure.

DETAILED DESCRIPTION

Figure 1:
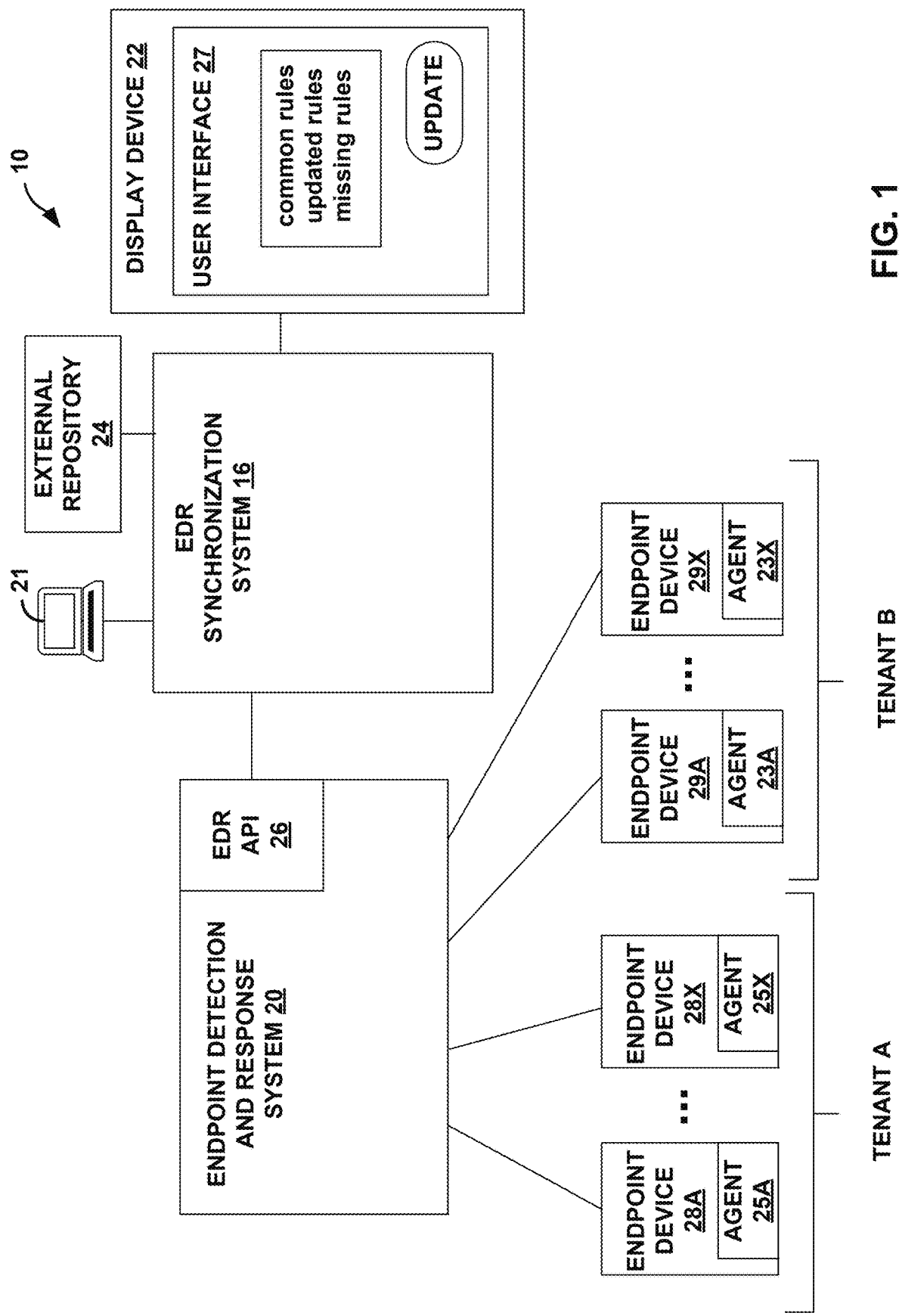
FIG. 1 is a block diagram illustrating an example network system including an Endpoint Detection and Response (EDR) system and an EDR synchronization system, in accordance with the techniques of this disclosure.

FIG. 1 is a block diagram illustrating an example network system 10 including Endpoint Detection and Response (EDR) system 20 and EDR synchronization system 16, in accordance with the techniques of this disclosure. EDR system 20 may combine real-time continuous monitoring and collection of endpoint data with rules-based automated response and analysis capabilities. EDR system 20 may detect and investigate suspicious activities on hosts and endpoints, employing a high degree of automation to enable security teams to identify and respond to threats quickly.

EDR system 20 may monitor and collect activity data from endpoints that could indicate a threat. EDR system 20 may analyze activity data to identify threat patterns. EDR system 20 may automatically respond to identified threats, remove or contain them, and notify security personnel. EDR system 20 may use forensics and analysis tools to research identified threats and search for suspicious activities.

EDR system 20 may be in communication with agents 25A-25X and 23A-23X at endpoint devices 28A-28X and 29A-29X to conduct endpoint monitoring and collect data such as processes, connections, volume of activity, and data transfers. Endpoint devices 28A-28X and 29A-29X may be any computing device such as laptop or desktop computers, tablet computers, so-called "smart" phones, "smart" pads, "smart" watches, or other personal digital appliances equipped for wired or wireless communication. Collected data may be sent or pushed by agents 25, 23 EDR system 20 and/or retrieved or pulled from agents 25, 23 by EDR system 20. Upon receipt, EDR system 20 may store the collected data in a database (not shown).

EDR system 20 may incorporate real-time analytics and forensics tools for threat hunting or conducting a post-mortem analysis of an attack. A real-time analytics engine of EDR system 20 may use algorithms to evaluate and correlate large amounts of data and search for security-related patterns. Forensics tools of EDR system 20 may enable IT security professionals, e.g., using computing device 21, to investigate past breaches to better understand how an exploit works and how it penetrated security. IT security professionals using computing system 21 may also use the forensics tools of EDR system 20 to hunt for threats in the system, such as malware or other exploits that might lurk undetected on an endpoint.

EDR system 20 may use rules, such as endpoint indicators-of-attack (IOA) security rules, so that EDR system 20 may recognize when incoming data indicates a known type of security breach. Once a security breach is detected, EDR system 20 may trigger an automatic response, such as logging off the end-user or sending an alert to an administrator.

EDR system 20 may serve multiple tenants. In the example of FIG. 1, endpoint devices 28A-28X are part of Tenant A, and endpoint devices 29A-29X are part of Tenant B. Each tenant may have its own set of endpoint IOA security rules. For example, tenant A may be a primary tenant, and tenant B may be a test tenant with different endpoint IOA security rules. Once the testing on tenant B is complete, an administrator may manually transfer the endpoint IOA security rules for the tenant B to tenant A for normal operations.

In accordance with techniques described in this disclosure, EDR synchronization system 16 may be used to synchronize, update and transfer endpoint IOA security rules for different tenants. EDR synchronization system 16 may make it easier and less error-prone to transfer security rules from one tenant to another tenant of the EDR system 20. Manual transfers by humans are more likely to propagate errors than the EDR synchronization system 16 automatically updating the rules.

EDR synchronization system 16 may receive source data, including first endpoint IOA security rules for a source tenant of EDR system 20. The source data including first endpoint IOA security rules may be obtained from EDR system 20 through EDR application programming interface (API) 26, external repository 24, or from another location.

EDR synchronization system 16 may receive destination data including second endpoint IOA security rules for a source tenant of EDR system 20. The destination data including second endpoint IOA security rules may be obtained from EDR system 20 through EDR API 26, external repository 24, or from another location.

The EDR synchronization system 16 may perform a difference operation between the first IOA security rules of the source data and the second endpoint IOA security rules of the destination data. The difference operation may determine common rules, updated rules, and missing rules between the first endpoint IOA security rules for the source tenant and the second endpoint IOA security rules for the destination tenant. The difference operation may be a character-by-character comparison of source and destination rules to determine differences between source and destination rules.

An updated rule is a rule that has been modified between the first endpoint IOA security rules for the source tenant and the second endpoint IOA security rules for the destination tenant. A missing rule is a rule that appears in the second endpoint IOA security rules for the destination tenant but not in the first endpoint IOA security rules for the source tenant. A common rule is a rule that appears in both the first endpoint IOA security rules for the source tenant and the second endpoint IOA security rules for the destination tenant without modifications. Indicating common, updated and missing rules allows an administrator to more easily identify the differences between the first endpoint IOA security rules for the source tenant and the second endpoint IOA security rules for the destination tenant. For example, common rules do not require as much review since they are unchanged between the first endpoint IOA security rules for the source tenant and the second endpoint IOA security rules for the destination tenant.

The source data and the destination data may be in the JavaScript Object Notation (JSON) format. JSON uses name/value pairs and ordered lists of values as data structures. EDR synchronization system 16 may use the structure of the JSON format to determine the beginning and end of rules and/or to align the source and destination rules for differencing operations.

EDR synchronization system 16 may generate data representative of a user interface 27 for display at an administrator computing device. The user interface 27 may indicate common rules, updated rules, and missing rules between the first endpoint IOA security rules for the source tenant and the second endpoint IOA security rules for the destination tenant.

EDR synchronization system 16 may be connected to another computer device 21, which may be used by the administrator to control EDR synchronization system 16 and/or display (e.g., via display device 22) a user interface 27 generated by EDR synchronization system 16 from the comparison data produced by EDR synchronization system 16. Display device 22 may display a user interface 27 created using data produced by EDR synchronization system 16. The example display device 22 displays a user interface 27 indicating the common rules, updated rules, and missing rules between the first endpoint IOA security rules for the source tenant and the second endpoint IOA security rules for the destination tenant using the data from EDR synchronization system 16. The user interface 27 displayed on display device 22 enables computing device 21 to receive user input, e.g., from the administrator via the user interface 27, to update the endpoint IOA security rules for the destination tenant. Exemplary user interfaces displayed on display device 22 of computing device 21 and produced based on data from EDR synchronization system 16 are shown in FIGS. 3-7 discussed below.

EDR synchronization system 16 may determine different colors to assign to each of the common rules, the updated rules, and the missing rules and generate data representative of the different colors. Display device 22 may indicate the common rules, updated rules, and missing rules between the first endpoint IOA security rules for the source tenant and the second endpoint IOA security rules using different colors as part of the user interface 27 indicating the common rules, the updated rules, and the missing rules. For example, new rules may be indicated in green, deleted rules may be indicated in red and modified rules may be indicated in yellow. Such color coding allows the user to quickly and intuitively evaluate the differences between the first endpoint IOA security rules for the source tenant and the second endpoint IOA security rules.

EDR synchronization system 16 may automatically update the second endpoint IOA security rules for the destination tenant based on the first endpoint IOA security rules for the source tenant. For example, EDR synchronization system 16 may replace one or more of the second endpoint IOA security rules for the destination tenant with one or more of the first endpoint IOA security rules for the source tenant. EDR synchronization system 16 may allow for complete or partial replacement of rules as controlled by a user. A user may select rules to update or to select to update all of the rules.

Figure 7:
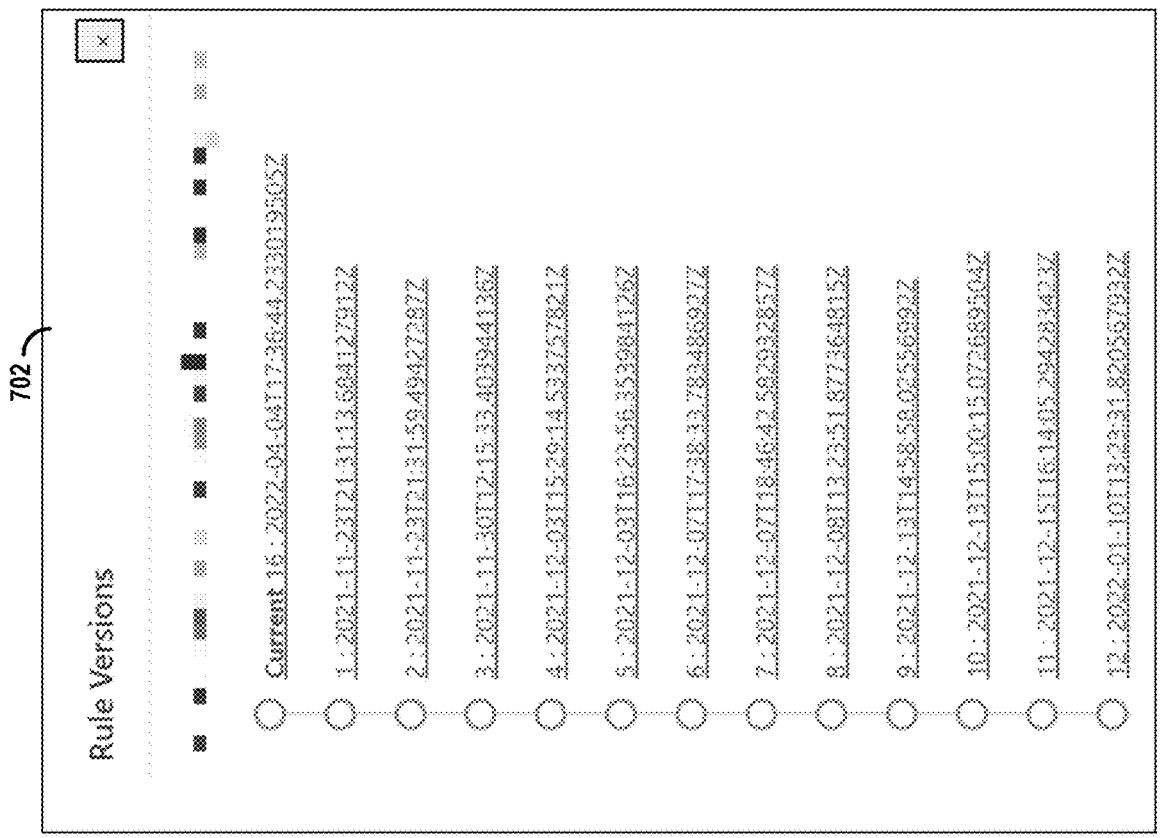
FIG. 7 illustrates an example rule version selection interface generated by the EDR synchronization system for display on a user device, in accordance with the techniques of this disclosure.

EDR synchronization system 16 may allow the user to select source and destination data. For example, the user may select data for a test environment as the source data and the current production environment as the source data. The test environment may be used to test out new rules that then may be moved over to the production environment. EDR synchronization system 16 may allow users to select a comparison between these source and destination rules. This comparison may be a character by character comparison of rules of the source and destination data. The comparison allows the user to evaluate whether to update the destination data with the source data. For example, the comparison highlights differences between source and destination data and thus allows a user to easily see whether the correct source and destination data was selected. The user may see that all the desired changes are included and that the source data does not contain any desirable rules that would be written over if the destination data is copied over as the destination data EDR synchronization system 16 may compare multiple versions of the source data to allow a user to select a version of the source data to use for the difference operation with the destination data. EDR synchronization system 16 may allow the user to compare versions of the source and destination data. This may be useful to allow the user to figure out a backup or checkpoint version of the rules to roll back to. For example, if the current version of the rules is not working well, a comparison with a previous set of rules allows the user to find and remove newer rules that may be causing problems and to accept newer rules that look good. As shown in FIG. 7 below, a rule version selection interface may be used to allow the user to select a version of the source data.

EDR synchronization system 16 may generate data representative of a source data user interface 27 to display the source data, and receive user input via the user interface 27 that includes modifications to the source data. For example, the comparison may allow the user to see a new rule that is undesirable in a production environment or a deleted rule that is desirable in the production environment. The user may then modify the rule with editor functionality provided by the EDR synchronization system 16. EDR synchronization system 16 may produce edited source data based on the user input, and automatically update the endpoint security rules for the destination tenant based on the edited source data.

EDR synchronization system 16 has a number of advantages over prior systems. Rather than manually copying over rules, EDR synchronization system 16 allows for the rules to be automatically copied over without the risk of manual errors or typos. EDR synchronization system 16 automatically allows users to update the security rules for destination tenants. EDR synchronization system 16 also allows for the analysis and editing of the associated rules.

Figure 2:
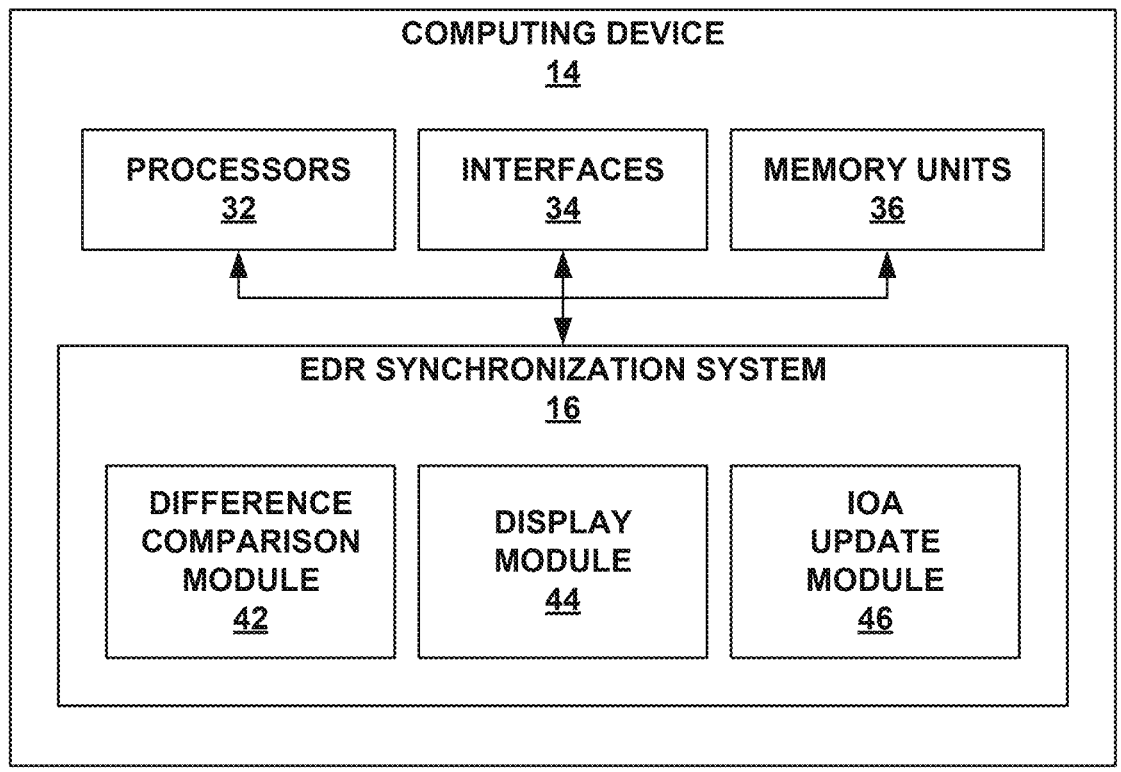
FIG. 2 is a block diagram illustrating an example computing device executing the EDR synchronization system from FIG. 1 in greater detail.

FIG. 2 is a block diagram illustrating an example computing device 14 executing the EDR synchronization system 16 from FIG. 1 in greater detail. The architecture of computing device 14 illustrated in FIG. 2 is shown for exemplary purposes only. Computing device 14 should not be limited to the illustrated example architecture. In other examples, computing device 14 may be configured in a variety of ways.

As shown in the example of FIG. 2, computing device 14 includes one or more processors 32, one or more interfaces 34, and one or more memory units 36. Computing device 14 also includes EDR synchronization system 16, which may be implemented as program instructions and/or data stored in memory units 36 and executable by processors 32 or implemented as one or more hardware units or devices of computing device 14. Memory units 36 of computing device 14 may also store an operating system (not shown) executable by processors 32 to control the operation of components of computing device 14. The components, units, or modules of computing device 14 are coupled (physically, communicatively, and/or operatively) using communication channels for inter-component communications. In some examples, the communication channels may include a system bus, a network connection, an inter-process communication data structure, or any other method for communicating data.

Processors 32, in one example, may comprise one or more processors that are configured to implement functionality and/or process instructions for execution within computing device 14. For example, processors 32 may be capable of processing instructions stored by memory units 36. Processors 32 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory units 36 may be configured to store information within computing device 14 during operation. Memory units 36 may include a computer-readable storage medium or computer-readable storage device. In some examples, memory units 36 include one or more of a short-term memory or a long-term memory. Memory units 36 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory units 36 are used to store program instructions for execution by processors 32. Memory units 36 may be used by software or applications running on computing device 14 (e.g., EDR synchronization system 16) to temporarily store information during program execution.

Computing device 14 may utilize interfaces 34 to communicate with external devices via one or more networks, e.g., network system 10 of FIG. 1. Interfaces 34 may be network interfaces, such as Ethernet interfaces, optical transceivers, radio frequency (RF) transceivers, or any other type of devices that can send and receive information. Other examples of such network interfaces may include Wi-Fi or Bluetooth radios. In some examples, computing device 14 utilizes interfaces 34 to wirelessly communicate with external devices, e.g., EDR system 20, computer device 21, and external repository 24 from FIG. 1, or other computing devices within network system 10.

In the illustrated example of FIG. 2, EDR synchronization system 16 includes difference comparison module 42, display module 44 and IOA update module 46. In other examples, EDR synchronization system 16 may include more or fewer functional units.

Although illustrated in FIG. 2 as including a single computing device 14 executing EDR synchronization system 16 may comprise a centralized or distributed system of computing devices, such as desktop computers, laptops, workstations, wireless devices, cloud-based compute nodes, network-ready appliances, file servers, print servers, database or storage servers, or other devices, configured to execute and/or support all or a portion of EDR synchronization system 16.

EDR synchronization system 16 may comprise a software application executing on computing device 14 that generates data representative of a user interface, such as user interface 27 of FIG. 1, for display. Although illustrated in FIG. 2 as being executed locally on computing device 14, in other examples EDR synchronization system 16 may comprise a cloud-hosted application on a cloud platform that may be integrated with software-as-a-service (SaaS) providers.

In accordance with techniques described in this disclosure, EDR synchronization system 16 may include modules such as difference comparison module 42, IOA update module 46, and display module 44 to implement certain functionality. Difference comparison module 42 may perform a difference operation between the first endpoint IOA security rules of the source data and the second endpoint IOA security rules of the destination data. IOA update module 46 may update the endpoint IOA security rules for the destination tenant. Display module 44 may provide display data for a user interface, such as user interface 27 of FIG. 1. For example, difference comparison module 42 may allow users to select a comparison between these source and destination rules. Difference comparison module 42 may do a character by character comparison of rules of the source and destination data. The comparison allows a user to evaluate whether to update the destination data with the source data.

Display module 44 may generate a user interface based on the comparison and provide this user interface to a user to allow them to evaluate and edit the source and destination rules. Based on the comparison, the user may determine to do an update. IOA update module 46 allows the user to update the destination rules based on the comparison. IOA update module 46 may allow the user to automatically update security rules for a destination tenant based on first endpoint IOA security rules for a source tenant. IOA update module 46 may also allow for the editing and selection of specific rules.

Figure 3:
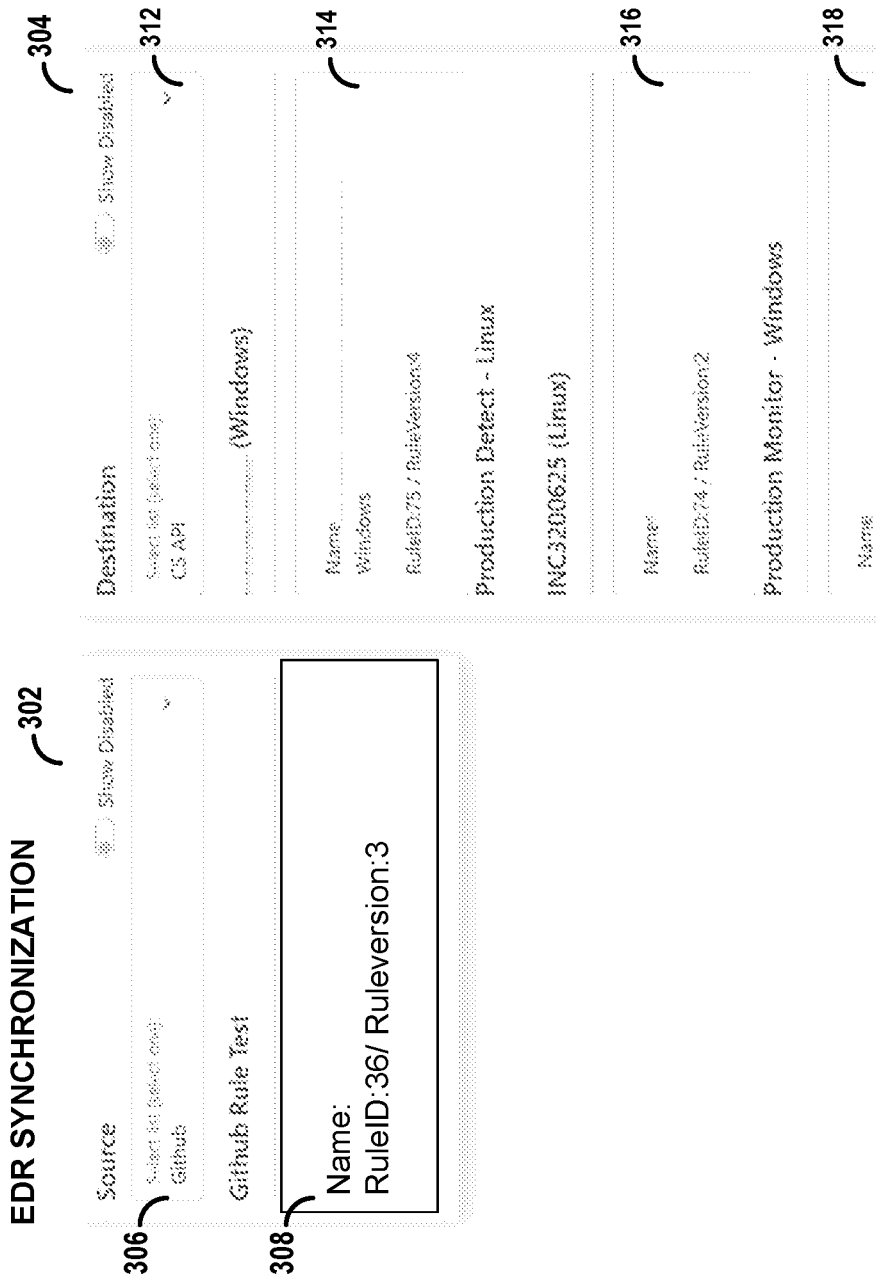
FIG. 3 illustrates an example source and destination selection interface generated by the EDR synchronization system for display on a user device, in accordance with the techniques of this disclosure.

FIG. 3 illustrates an example source selection interface 302 and destination selection interface 304 generated by the EDR synchronization system for display on a user device, in accordance with the techniques of this disclosure. Source selection interface 302 may be used to select the endpoint IOA security rules for the source. In the example of FIG. 3, field 306 comprises a drop-down menu by which source selection interface 302 receives user input to select the set of rules for the source. In the example of FIG. 3, the source rules are obtained from a Github repository. Field 308 identifies the source rules selected.

Destination selection interface 304 may be used to select the endpoint IOA security rules for the destination. In the example of FIG. 3, field 312 comprises a drop-down menu by which destination selection interface 302 receives user input to select rules for the destination. In the example of FIG. 3, the destination rules are accessed through an API. For example, EDR API 26 of EDR system 20 of FIG. 1 may be used to access the destination rules. Fields 314 and 316 identify and allow access to rules associated with the destination data. Field 318 shows details of a production monitor associated with the destination rules.

Figure 4:
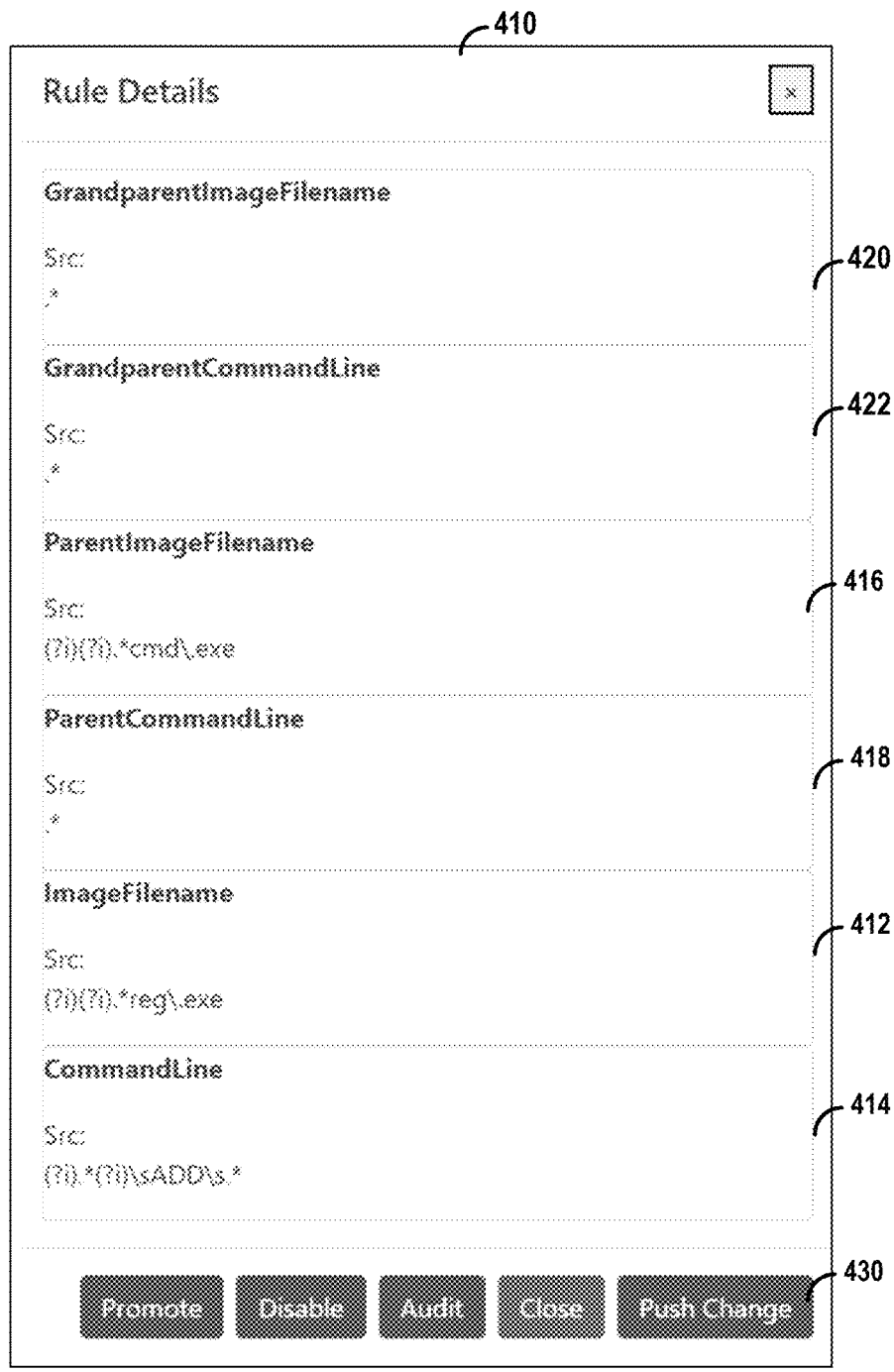
FIG. 4 illustrates an example rule detail interface generated by the EDR synchronization system for display on a user device, in accordance with the techniques of this disclosure.

FIG. 4 illustrates an exemplary rule detail interface 410 generated by the EDR synchronization system for display on a user device, in accordance with the techniques of this disclosure. Rule detail interface 410 indicates the rule image name in field 412 and an associated command line in field 414. Rule detail interface 410 may also display previous versions of the rules. In the example of FIG. 4, rule detail interface 410 indicates the parent rule image name in field 416 and an associated parent command line in field 418; and indicates the grandparent rule image name in field 420 and an associated grandparent command line in field 422. The parent and grandparent image and file name relate to the previous versions of the rule.

Rule detail interface 410 includes a "push changes" button 430 by which rule detail interface 410 receives user input from an administrator to save changes to the rules. In response to receipt of user input indicating a selection of "push changes" button 430, EDR synchronization system 16 may initiate an automatic update of the second endpoint IOA security rules for the destination tenant based on the first endpoint IOA security rules for the source tenant.

Figure 5:
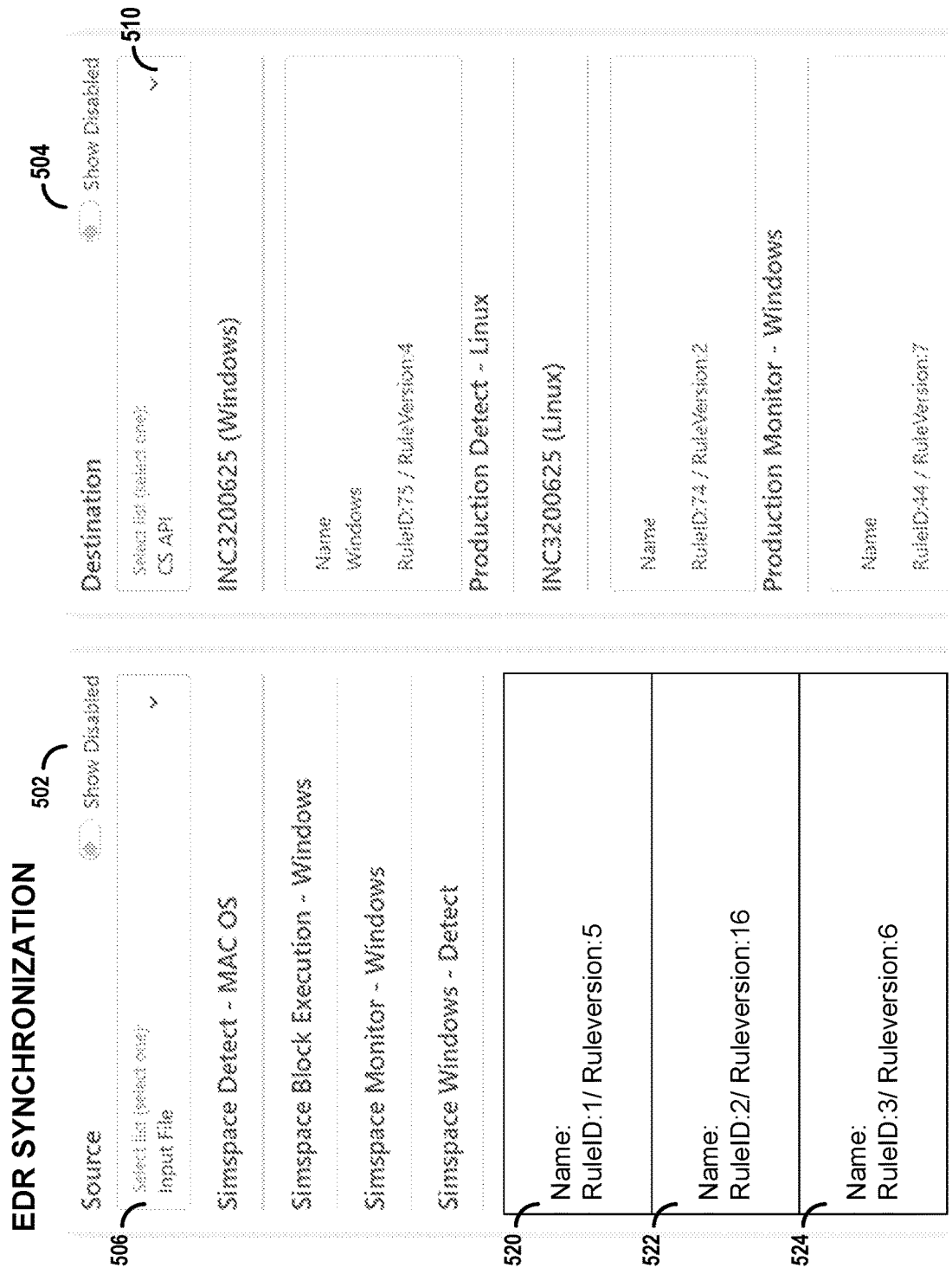
FIG. 5 illustrates an example source and destination selection interface generated by the EDR synchronization system for display on a user device, in accordance with the techniques of this disclosure.

FIG. 5 illustrates an exemplary source selection interface 502 and destination selection interface 504 generated by the EDR synchronization system for display on a user device, in accordance with the techniques of this disclosure. Source selection interface 502 may be used to select the endpoint IOA security rules for the source. In the example of FIG. 5, field 506 comprises a drop-down menu by which source selection interface 502 receives user input to select rules for the source. In the example of FIG. 5, the source rules are obtained from a local file.

Destination selection interface 504 may be used to select the endpoint IOA security rules for the destination. In the example of FIG. 5, field 510 comprises a drop-down menu by which source selection interface 502 receives user input to select rules for the destination. In the example of FIG. 5, the destination rules are accessed through an API. For example, EDR API 26 of FIG. 1 may be used to access the destination rules.

Source selection interface 502 also shows the result of a difference comparison operation between the source and the destination rules. In the example of FIG. 5, "RuleID:1" in field 520 may be a common rule; "RuleID:2" in field 522 may be a modified rule and "RuleID:3" in field 524 may be a missing rule. The source selection interface 502 may provide indications such as color coding (using colors such as using red, green, yellow and/or other colors), icons, or text to indicate whether a rule is common, modified or missing. These indications allow an administrator to make sure that the source rules are correct before copying them over to the destination. For example, the administrator may focus on reviewing the modified and missing rules rather than unmodified rules. Source selection interface 502 may use color or other features to indicate common, modified, and missing rules.

FIG. 6 illustrates example rules editing interface 602 generated by the EDR synchronization system for display on a user device, in accordance with the techniques of this disclosure. Rules editing interface 602 allows for the editing of rules. A user may the user click on the rules editing interface 602 and manually modify the file path or file type. In the example of FIG. 6, rules editing interface 602 shows the differences between the source and destination rules for different features of the rules, such as "File Path" and "File Type."

Rules editing interface 602 includes a "push changes" button 630 by which rule detail interface 410 receives user input from an administrator to save changes to the rules. In response to receipt of user input indicating a selection of "push changes" button 630, EDR synchronization system 16 may initiate an automatic update of the second endpoint IOA security rules for the destination tenant based on the first endpoint IOA security rules for the source tenant.

FIG. 7 illustrates an exemplary rule version selection interface 702 generated by the EDR synchronization system for display on a user device, in accordance with the techniques of this disclosure. Rule version selection interface 702 showing a single set of rules with a current version and multiple previous versions. Rule version selection interface 702 allows administrators to select different versions of rules, such as source or destination rules. An administrator may use rule version selection interface 702 to keep track of the changes in the rules and roll back rules to the previous version if necessary. A selected version of the rules may be compared to source or destination rules using the interfaces shown in FIGS. 3 and 5.

Figure 8:
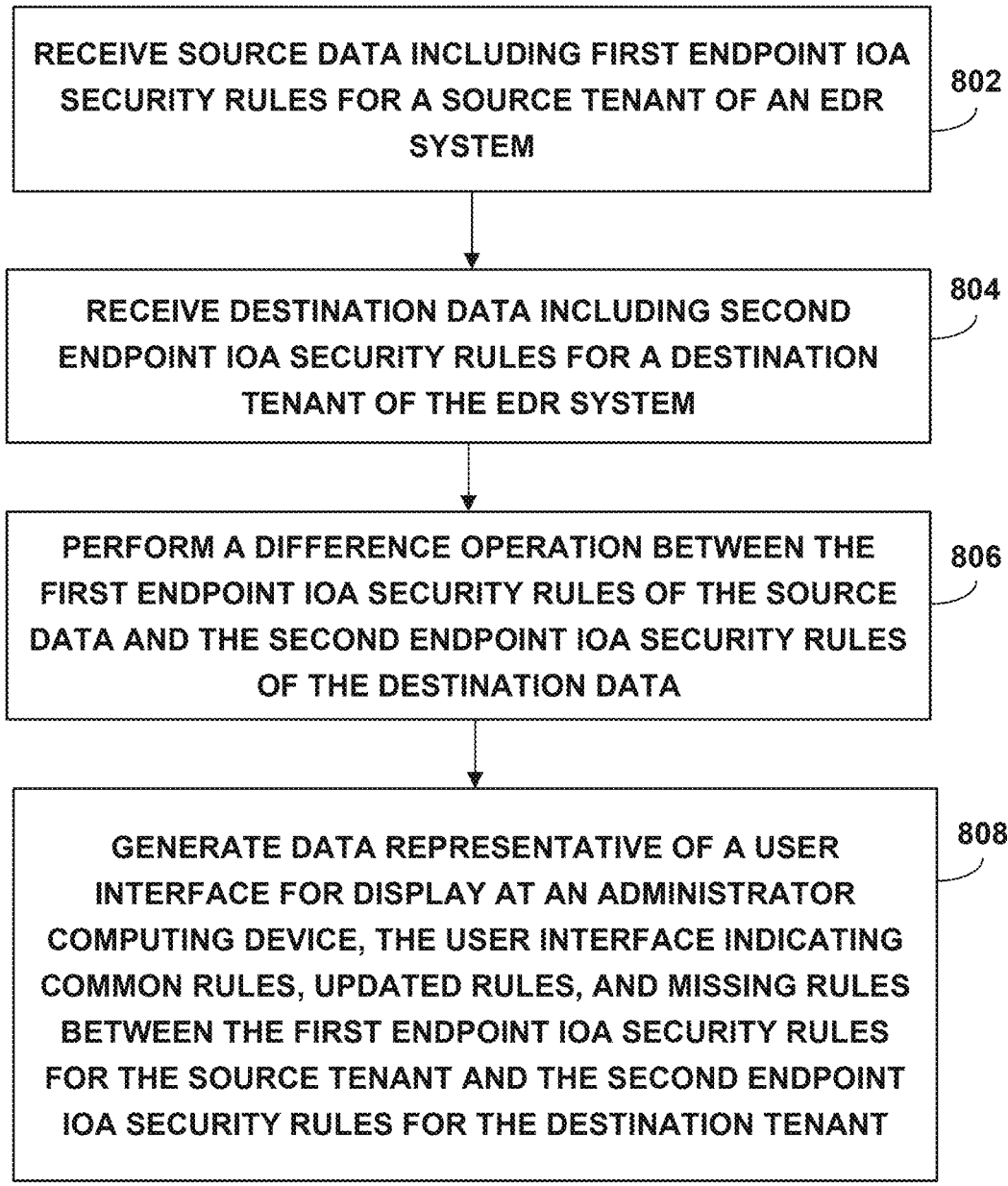
FIG. 8 is a flow diagram illustrating an example operation of a network system including an Endpoint Detection and Response (EDR) system and an EDR synchronization system, in accordance with the techniques of this disclosure.

FIG. 8 is a flow diagram illustrating an example operation of a network system including an EDR system and an EDR synchronization system, in accordance with the techniques of this disclosure. The example operation of FIG. 8 is described with respect to the EDR synchronization system 16 of FIGS. 1 and 2 and the EDR system 20 of FIG. 1.

EDR synchronization system 16 may receive source data including first endpoint IOA security rules for a source tenant of an EDR system 20 (802). EDR synchronization system 16 may receive destination data, including second endpoint IOA security rules for a destination tenant of the EDR system (804). EDR synchronization system 16 may obtain source and destination rules from EDR system 20 through EDR API 26, external repository 24, or from another location.

EDR synchronization system 16 may perform a difference operation between the first IOA security rules of the source data and the second endpoint IOA security rules of the destination data (806). EDR synchronization system 16 may generate data representative of a user interface 27 for display at an administrator computing device, the user interface indicating common rules, updated rules, and missing rules between the first endpoint IOA security rules for the source tenant and the second endpoint IOA security rules for the destination tenant (808). A common rule is a rule that is included in both the source and destination versions. An updated rule is a rule that is included in both the source and destination versions but that has a difference between the source and destination versions. A missing rule is a rule that is included in the destination version but not included in the source version.

It is to be recognized that depending on the example, certain acts or events of any of the techniques described herein may be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that may be accessed by one or more computers or one or more processors to retrieve instructions, code and/or data structures for implementation of the techniques described in this disclosure. A computer program product may include a computer-readable medium.

By way of example, and not limitation, such computer-readable storage media may comprise RAM, ROM, EEPROM, CD-ROM or other optical disk storage, magnetic disk storage, or other magnetic storage devices, flash memory, or any other medium that may be used to store desired program code in the form of instructions or data structures and that may be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A method comprising:
   receiving, at a computing system, source data including first endpoint indicators-of-attack (IOA) security rules for a source tenant of an Endpoint Detection and Response (EDR) system, wherein the EDR system serves a plurality of tenants that include the source tenant;
   receiving, at the computing system, destination data including second endpoint IOA security rules for a destination tenant of the plurality of tenants served by the EDR system;
   performing, at the computing system, a difference operation between the first endpoint IOA security rules of the source data and the second endpoint IOA security rules of the destination data;
   generating, at the computing system, data representative of a user interface for display at an administrator computing device, the user interface indicating common rules, updated rules, and missing rules between the first endpoint IOA security rules for the source tenant and the second endpoint IOA security rules for the destination tenant; and
   based on user input received via the user interface, automatically updating, at the computing system, the second endpoint IOA security rules to synchronize the first endpoint IOA security rules for the source tenant and the second endpoint IOA security rules for the destination tenant.

2. The method of claim 1, wherein automatically updating the second endpoint IOA security rules for the destination tenant is based on the first endpoint IOA security rules for the source tenant.

3. The method of claim 1, wherein automatically updating the second endpoint IOA security rules for the destination tenant includes replacing one or more of the second endpoint IOA security rules for the destination tenant with one or more of the first endpoint IOA security rules for the source tenant.

4. The method of claim 1, wherein receiving the source data comprises receiving the source data from the EDR system via an EDR application programming interface (API).

5. The method of claim 1, wherein receiving the source data comprises receiving the source data from a repository.

6. The method of claim 1, wherein the source data and the destination data are in a JavaScript Object Notation (JSON) format.

7. The method of claim 1, wherein generating the data representative of the user interface includes:
   determining, at the computing system, different colors to assign to each of the common rules, the updated rules, and the missing rules; and
   generating data representative of the different colors as part of the user interface indicating the common rules, the updated rules, and the missing rules.

8. The method of claim 1, wherein generating the data representative of the user interface further comprises:
   generating data representative of a source selection interface so as to allow a user to select a version of the source data from multiple versions of the source data to use for the difference operation with the destination data, and wherein performing the difference operation further comprises:
   comparing the multiple versions of the source data to the destination data.

9. The method of claim 1, wherein the user input is first user input, the method further comprising:
   generating data representative of a source data user interface to display the source data;
   receiving second user input via the user interface, wherein the second user input includes modifications to the source data; and
   producing edited source data based on the second user input, and
   wherein automatically updating the second endpoint IOA security rules for the destination tenant is based on the edited source data.

10. The method of claim 1, wherein performing the difference operation comprises comparing characters of text of the first IOA security rules of the source data and the second endpoint IOA security rules of the destination data to determine which rules of the first IOA security rules of the source data and the second endpoint IOA security rules have differences.

11. A computing system comprising:
    a memory; and
    one or more processors in communication with the memory and configured to:
    receive source data including first endpoint indicators-of-attack (IOA) security rules for a source tenant of an Endpoint Detection and Response (EDR) system, wherein the EDR system serves a plurality of tenants that include the source tenant;
    receive destination data including second endpoint IOA security rules for a destination tenant of the EDR system;
    perform a difference operation between the first endpoint IOA security rules of the source data and the second endpoint IOA security rules of the destination data;
    generate data representative of a user interface for display at an administrator computing device, the user interface indicating common rules, updated rules, and missing rules between the first endpoint IOA security rules for the source tenant and the second endpoint IOA security rules for the destination tenant; and based on user input received via the user interface, automatically update the second endpoint IOA security rules to synchronize the first endpoint IOA security rules for the source tenant and the second endpoint IOA security rules for the destination tenant.

12. The computing system of claim 11, wherein to automatically update the second endpoint IOA security rules for the destination tenant, the one or more processors are further configured to:

automatically update the second endpoint IOA security rules for the destination tenant based on the first endpoint IOA security rules for the source tenant.

13. The computing system of claim 11, wherein to automatically update the second endpoint IOA security rules for the destination tenant, the one or more processors are further configured to:

replace one or more of the second endpoint IOA security rules for the destination tenant with one or more of the first endpoint IOA security rules for the source tenant.

14. The computing system of claim 11, wherein to receive the source data, the one or more processors are further configured to:

receive the source data from an EDR application programming interface (API).

15. The computing system of claim 11, wherein to receive the source data, the one or more processors are further configured to:

receive the source data from a repository.

16. The computing system of claim 11, wherein the source data and the destination data are in a JavaScript Object Notation (JSON) format.

17. The computing system of claim 11, wherein to generate the data representative of the user interface, the one or more processors are further configured to:

determine different colors to assign to each of the common rules, the updated rules, and the missing rules; and generate data representative of the different colors as part of the user interface indicating the common rules, the updated rules, and the missing rules.

18. The computing system of claim 11, wherein to generate the data representative of the user interface, the one or more processors are further configured to:

generate data representative of a source selection interface so as to allow a user to select a version of the source data from multiple versions of the source data to use for the difference operation with the destination data, and wherein to perform the difference operation, the one or more processors are further configured to:

compare the multiple versions of the source data to the destination data.

19. The computing system of claim 11, wherein the user input is first user input, and wherein the one or more processors are further configured to:

generate data representative of a source data user interface to display the source data;

receive second user input via the user interface, wherein the second user input includes modifications to the source data; and produce edited source data based on the second user input, and wherein to automatically update the second endpoint IOA security rules for the destination tenant is based on the edited source data.

20. A non-transitory computer readable medium comprising instructions that when executed cause one or more processors to:

receive source data including first endpoint indicators-of-attack (IOA) security rules for a source tenant of an Endpoint Detection and Response (EDR) system, wherein the EDR system serves a plurality of tenants that include the source tenant;

receive destination data including second endpoint IOA security rules for a destination tenant of the plurality of tenants served the EDR system;

perform a difference operation between the first endpoint IOA security rules of the source data and the second endpoint IOA security rules of the destination data;

generate data representative of a user interface for display at an administrator computing device, the user interface indicating common rules, updated rules, and missing rules between the first endpoint IOA security rules for the source tenant and the second endpoint IOA security rules for the destination tenant; and based on user input received via the user interface, automatically update the second endpoint IOA security rules to synchronize the first endpoint IOA security rules for the source tenant and the second endpoint IOA security rules for the destination tenant.

\* \* \* \* \*